United States Patent Office 2,816,012
Patented Dec. 10, 1957

2,816,012
HEAT-PRODUCING COMPOSITIONS

George Walton, Sharonville, Ohio, assignor to The Drackett Company, Cincinnati, Ohio, a corporation of Ohio No Drawing. Application April 4, 1955,
Serial No. 499,231

6 Claims. (Cl. 44—3)

This invention relates to new and improved compositions for the production of heat and is particularly concerned with the type of composition consisting of a mixture of dry ingredients which, when admixed with water, are capable of reacting rapidly to liberate heat.

Mixtures of chemical agents for this purpose have long been in common use for supplying heat to so-called fireless cookers, for the cleaning of grease clogged drains, and for other purposes in which the generation of heat is required. A mixture frequently employed for this purpose includes as its essential heat-producing ingredients aluminum and an alkaline agent such as sodium or potassium hydroxide, the addition of water to the mixture causing the aluminum and alkali to react rapidly, producing both heat and mechanical agitation. In addition, the mixture may include, as shown in my copending application, Serial No. 356,091, filed May 19, 1953, now Patent No. 2,773,040, an oxidizing agent such as sodium nitrate, to combine with hydrogen liberated in the reaction.

Mixtures of this character are conveniently prepared in substantially dry, divided form and one of the chief problems in the preparation of these compositions, to which my prior application is addressed, is that of obtaining a uniform distribution of aluminum, which is in minor amount, in the alkaline agent which is normally present in amount at least twice that theoretically required for combination with aluminum, or at least about eight times the amount by weight of aluminum.

I have now discovered that the effectiveness of the compositions of the type described may be greatly enhanced by the inclusion in the mixture of significant amounts of copper, the advantages of the use of copper being threefold. First, the presence of copper in appropriate amount serves to accelerate the primary reaction of the aluminum and the alkaline agent; second, copper serves as a catalyst for the secondary reaction between the evolved hydrogen and the oxidizing agent, whereby the nitrate is reduced in greater degree to harmless ammonia and soluble ammoniacal compounds; third, copper may be employed in large amounts (greater than necessary for the performance of the foregoing functions) to slow down the reaction rate, the excess copper acting as a simple diluent.

It is accordingly the primary object of the invention to incorporate, in a heat-producing composition of the type described and comprising, in substantially dry admixture in particulate form, aluminum, an alkaline agent, and an oxidizing agent in amounts effective for the stated purposes, a small amount of copper, not less than 0.4% of the amount of aluminum, whereby the secondary reaction between the oxidizing agent and the hydrogen involved in the primary reaction is promoted and other benefits, including those herein enumerated, are achieved.

More specifically, it is an object of the invention to provide a new and improved composition capable of evolving heat in the presence of water, and comprising, in admixture in substantially dry particulate form, aluminum, an alkali metal hydroxide in excess of the theoretical amount required for combination with the aluminum, a water-soluble inorganic nitrate in amount sufficient to combine with evolved hydrogen, and copper in amount from 0.4% to 4% by weight of aluminum.

My invention is applicable to any heat-producing composition of the type employing, as the principal heat-producing components, aluminum, an alkaline agent capable of reacting with the aluminum to produce heat in the presence of water, and an oxidizing agent. The alkaline agent commonly employed for the purpose, of course, is sodium hydroxide, and alkali metal hydroxides generally are preferred, but other alkaline agents functioning similarly may be used. Mixtures of different agents may be employed if desired. Water-soluble inorganic nitrates, such as the alkali metal and alkaline earth metal nitrates, are highly effective oxidizing agents, sodium nitrate being preferred for economic reasons.

The mixture may include, in addition to the principal ingredients, such further ingredients as may promote the desired action, either to increase the production of heat or for other purposes incidental to the use for which the mixture is designed. Thus catalytic agents, additional heat-generating agents and inert ingredients acting merely as carriers or fillers may be employed. In general, whatever the constitution of the whole mixture, it is common practice to limit the aluminum content to form about 2% to about 8% by weight of the total composition, the alkaline agent being usually employed in an amount at least about twice that required for combination with the aluminum, and often constituting the major ingredient of the composition.

It will be understood, however, that the present invention does not contemplate the production of an essentially new heat-producing composition and is not concerned with the formulation of the composition, excepting only generally as hereinbefore indicated. On the contrary, the invention relates solely to the discovery of the advantages flowing from the use in heat generating compositions utilizing the reaction of aluminum and an alkaline agent, and an oxidizing material, of a small amount of copper of the order of from 0.4% to 4% by weight of aluminum, optimum effectiveness being achieved by an amount of copper not less than 1% nor more than 1½%, based on aluminum content. It will thus be appreciated that the invention is broadly applicable to compositions of the type indicated, regardless of the presence or absence of further components, excepting only such compositions as contain additional ingredients functioning to impair substantially or to inhibit the heat-generating action of the alkali and aluminum. It will thus be understood that no limitation of the scope of the invention is intended by the following specific examples, which are merely representative of preferred compositions to which the invention has been applied.

*Example No. 1*

| | Parts by weight |
|---|---|
| Caustic soda | 54.50 |
| Sodium nitrate | 30.45 |
| Sodium chloride | 10.80 |
| Aluminum alloy chips [1] | 4.25 |

[1] Composition of alloy:

| | Parts by weight |
|---|---|
| Copper | 1.00 |
| Iron | 0.16 |
| Silicon | 0.14 |
| Magnesium | 0.36 |
| Manganese | 0.31 |
| Zinc | 0.05 |
| Titanium | 0.01 |
| Aluminum | 97.97 |

*Example No. 2*

| | Parts by weight |
|---|---|
| Caustic soda | 54.50 |
| Sodium nitrate | 30.45 |
| Sodium chloride | 10.45 |
| Aluminum alloy chips [1] | 4.25 |
| Copper sulfate, anhydrous | 0.35 |

[1] Composition of alloy:

| | Parts by weight |
|---|---|
| Copper | 0.009 |
| Iron | 0.30 |
| Silicon | 0.13 |
| Magnesium | 0.008 |
| Manganese | 0.006 |
| Zinc | 0.05 |
| Titanium | 0.005 |
| Aluminum | 99.49 |

*Example No. 3*

| | Parts by weight |
|---|---|
| Caustic soda | 54.50 |
| Sodium nitrate | 30.45 |
| Sodium chloride | 10.80 |
| Aluminum alloy chips [1] | 4.25 |

[1] Composition of alloy:

| | Parts by weight |
|---|---|
| Copper | 1.54 |
| Iron | 0.24 |
| Silicon | 0.14 |
| Magnesium | 2.35 |
| Manganese | 0.05 |
| Zinc | 5.65 |
| Titanium | 0.02 |
| Aluminum | 90.01 |

*Example No. 4*

| | Parts by weight |
|---|---|
| Caustic soda | 54.50 |
| Sodium nitrate | 30.45 |
| Sodium chloride | 10.80 |
| Aluminum alloy chips [1] | 4.25 |

[1] Composition of alloy:

| | Parts by weight |
|---|---|
| Copper | 4.54 |
| Iron | 0.33 |
| Silicon | 0.14 |
| Magnesium | 1.48 |
| Manganese | 0.58 |
| Zinc | 0.03 |
| Titanium | 0.02 |
| Aluminum | 92.88 |

*Example No. 5*

| | Parts by weight |
|---|---|
| Caustic soda | 54.50 |
| Sodium nitrate | 30.45 |
| Sodium chloride | 10.80 |
| Aluminum alloy chips [1] | 4.25 |

[1] Composition of alloy:

| | Parts by weight |
|---|---|
| Copper | 0.50 |
| Iron | 0.19 |
| Silicon | 0.10 |
| Magnesium | 0.001 |
| Manganese | 0.005 |
| Zinc | 0.05 |
| Titanium | 0.01 |
| Aluminum | 99.24 |

*Example No. 6*

| | Parts by weight |
|---|---|
| Caustic soda | 54.50 |
| Sodium nitrate | 30.45 |
| Sodium chloride | 10.80 |
| Aluminum alloy chips [1] | 4.25 |

[1] Composition of alloy:

| | Parts by weight |
|---|---|
| Copper | 0.70 |
| Titanium | 0.01 |
| Zinc | 0.01 |
| Iron | 0.45 |
| Silicon | 0.19 |
| Magnesium | 0.37 |
| Manganese | 0.02 |
| Chromium | 0.01 |
| Aluminum | 98.20 |

*Example No. 7*

| | Parts by weight |
|---|---|
| Caustic soda | 54.50 |
| Sodium nitrate | 30.45 |
| Sodium chloride | 10.80 |
| Aluminum alloy chips [1] | 4.25 |

[1] Composition of alloy:

| | Parts by weight |
|---|---|
| Copper | 0.90 |
| Titanium | 0.01 |
| Zinc | 0.05 |
| Iron | 0.83 |
| Silicon | 0.19 |
| Magnesium | 0.34 |
| Manganese | 0.005 |
| Chromium | 0.01 |
| Aluminum | 97.70 |

In each of the foregoing examples the ingredients are thoroughly mixed to obtain a homogeneous mixture, the composition so prepared is especially suitable for the clearing of clogged drains, sink traps, and the like. When three parts of the mixture are added to ten parts of water, immediate reaction occurs with the sustained liberation of a substantial amount of heat, considerable mechanical agitation being produced by the reaction. In each case the amount of copper is adequate to catalyze the reaction of the oxidizing agent with the evolved hydrogen, and to accelerate the primary reaction between the aluminum and the caustic. By the use of amounts of copper substantially in excess of 4% of the amount by weight of aluminum, dilution and retardation of the rate of the primary reaction are achieved. Thus the copper may be employed to control the reaction rate and, in addition, serves as a catalyst to promote combination of liberated hydrogen gas.

It is believed to be abundantly clear from the foregoing that although caustic soda is used in each of the specific examples, any water soluble alkaline agent capable of reacting with the aluminum to evolve heat may be substituted in any example with comparable effect, and that any oxidizing agent capable of combining with the evolved hydrogen may be employed in lieu of the sodium nitrate. As a practical matter, caustic soda and sodium nitrate are much preferred because of low cost and high efficiency, but as hereinbefore emphasized, the invention resides in the discovery of the beneficial effect of significant amounts of copper and is applicable to heat producing compositions of the type described in which reagents varying widely in character and amount are employed.

It is highly desirable that the copper be entrained or alloyed with the aluminum, to the end that adequate distribution of copper throughout the mixture may be assured. Nevertheless, the invention contemplates the addition of copper particles as such or the addition of copper in the form of its water soluble salts, as in Example 2, any inorganic water soluble copper salt being suitable for the purposes of the invention. However, when the copper is present in the form of salt, approximately twice the amount is required to obtain comparable results and the less expensive and by far the most efficient method is to provide an aluminum-copper alloy.

It will also be appreciated that the instant invention may be employed most effectively when the aluminum particle size is controlled within certain limits, although in the presence of copper, as proposed herein, the limits are less critical and the use of larger particles is possible than is indicated in my pending application aforementioned. Thus in the practice of the instant invention I may employ particles ranging in size from 70 to 350 particles per gram; the preferred range is from 70 to 170 particles per gram. It is both difficult and expensive to prepare aluminum particles of uniform size and shape. Accordingly, the largest particles which will give good aluminum distribution and an efficient reaction with the alkali should be employed.

Such other and further alterations and modifications of the composition are contemplated as would normally occur to those skilled in the art to which the invention relates.

Having thus described the invention, what is claimed as new and desired to be secured by Letters Patent is:

1. A composition liberating heat when added to water, comprising, in admixture in substantially dry and divided form, from about 2% to about 8% aluminum by weight of the composition, and an alkali metal hydroxide, the amount of alkaline agent being at least twice the theoretical amount required for combination with the aluminum, a water-soluble inorganic nitrate in amount sufficient to oxidize hydrogen released in the reaction, and copper in water soluble form in amount from 0.4% to 4.0% by weight of aluminum.

2. A composition liberating heat when added to water, comprising, in substantially dry admixture, aluminum in particulate form, an alkali metal hydroxide in amount at least about eight times the weight of aluminum, a water-soluble inorganic nitrate in amount sufficient to oxidize hydrogen released in the reaction, and copper alloyed with aluminum in amount from 0.4% to 4.0% by weight of aluminum.

3. A composition liberating heat when added to water, comprising, in substantially dry admixture, aluminum in particulate form, an alkali metal hydroxide in amount at least twice the theoretical amount required for combination with the aluminum, a water-soluble inorganic nitrate in amount sufficient to oxidize hydrogen released in the reaction, and copper alloyed with aluminum in amount from 1% to 1.5% by weight of aluminum.

4. A composition liberating heat when added to water, comprising, in substantially dry admixture, aluminum in particulate form, an alkali metal hydroxide in amount at least twice the theoretical amount required for combination with the aluminum, a water-soluble inorganic nitrate in amount sufficient to oxidize hydrogen released in the reaction, and copper alloyed with aluminum in amount from 0.4% to 4.0% by weight of aluminum.

5. A composition liberating heat when added to water, comprising, in substantially dry admixture, an alloy of aluminum with copper in particulate form and in substantially uniform size averaging from about 70 to about 350 particles per gram, an alkali metal hydroxide in amount at least twice the theoretical amount required for combination with the aluminum, a water-soluble inorganic nitrate in amount sufficient to oxidize hydrogen released in the reaction, the amount of copper being within 0.4% to 4.0% by weight of aluminum.

6. A composition liberating heat when added to water, comprising, in substantially dry admixture, aluminum in particulate form, an alkali metal hydroxide in amount at least twice the theoretical amount required for combination with the aluminum, a water-soluble inorganic nitrate in amount sufficient to oxidize hydrogen released in the reaction, and copper contained in the aluminum particles in amount from 0.4% to 4.0% by weight of aluminum.

References Cited in the file of this patent

UNITED STATES PATENTS

| | | |
|---|---|---|
| 1,019,377 | Smith | Mar. 5, 1912 |
| 1,814,741 | Dulany | July 14, 1931 |
| 2,010,800 | Adams | Aug. 13, 1935 |
| 2,183,587 | Racen et al. | Dec. 19, 1939 |